US008200084B2

(12) United States Patent
Bernstein et al.

(10) Patent No.: US 8,200,084 B2
(45) Date of Patent: Jun. 12, 2012

(54) ENCODING FOR INFORMATION NEEDED FOR ROUTING AND WAVELENGTH ASSIGNMENT IN WAVELENGTH SWITCHED OPTICAL NETWORKS

(75) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 835 days.

(21) Appl. No.: 12/180,025

(22) Filed: Jul. 25, 2008

(65) Prior Publication Data

US 2009/0116836 A1    May 7, 2009

Related U.S. Application Data

(60) Provisional application No. 60/984,429, filed on Nov. 1, 2007.

(51) Int. Cl.
*H04J 14/00* (2006.01)
(52) U.S. Cl. ............... 398/48; 398/49; 398/50; 398/51; 398/57; 398/59; 398/79; 398/3; 398/5; 398/7; 398/8; 370/351; 370/392; 370/400; 370/217; 370/389
(58) Field of Classification Search .............. 398/45, 398/48, 49, 50, 51, 56, 79, 34, 25, 17, 47, 398/46, 57, 58, 59, 69, 1, 2, 3, 5, 7, 8; 370/392, 370/401, 400, 352, 389, 465, 351, 355, 474, 370/225, 227, 228, 238, 216, 217, 254
See application file for complete search history.

(56) References Cited

U.S. PATENT DOCUMENTS

| 7,899,326 B2 * | 3/2011 | Shi et al. ................... 398/50 |
| 2006/0092952 A1 | 5/2006 | Boutros et al. |
| 2006/0215660 A1 * | 9/2006 | Vigoureux et al. ........ 370/392 |
| 2010/0221003 A1 * | 9/2010 | Bernstein et al. ............ 398/48 |

FOREIGN PATENT DOCUMENTS

| CN | 1369983 A | 9/2002 |
| CN | 1540934 A | 10/2004 |
| CN | 1878047 A | 12/2006 |
| CN | 1984452 A | 6/2007 |

(Continued)

OTHER PUBLICATIONS

Foreign Communication From a Related Counterpart Application—International Search Report and Written Opinion, PCT/CN2008/072161, Dec. 4, 2008, 7 pages.

(Continued)

*Primary Examiner* — Hanh Phan
(74) *Attorney, Agent, or Firm* — Conley Rose, P.C.; Grant Rodolph; Brandt Howell

(57) ABSTRACT

A network component comprising at least one control plane controller configured to implement a method comprising transmitting a message to at least one adjacent control plane controller, wherein the message comprises a Type-Length-Value (TLV) indicating Routing and Wavelength Assignment (RWA) information. Included is a method comprising communicating a message comprising a TLV to a control plane controller, wherein the TLV indicates RWA information. Also included is an apparatus comprising a control plane controller configured to communicate a TLV to at least one adjacent control plane controller, wherein the TLV indicates RWA information.

25 Claims, 7 Drawing Sheets

FOREIGN PATENT DOCUMENTS

| | | |
|---|---|---|
| CN | 101019372 A | 8/2007 |
| DE | 102006030293 A1 | 8/2007 |
| EP | 1881631 A1 | 1/2008 |
| WO | 2008/145067 A1 | 12/2008 |

OTHER PUBLICATIONS

Foreign Communication From a Related Counterpart Application—Extended European Search Report, 08784150.8, Jan. 12, 2011, 10 pages.

Awduche, D. et al., "Multiprotocol Lambda Switching: Combining MPLS Traffic Engineering Control with Optical Crossconnects," IEEE Communications Magazine, vol. 39, No. 3, Mar. 1, 2011, pp. 111-116.

Bernstein, G., et al., "Extending GMPLS/PCE for Use in Wavelength Switched Optical Networks," 2008 Optical Fiber Communication Conference/National Fiber Optic Engineers Conference IEEE, Piscataway, NJ, USA, 2008, pp. 955-957, XP002614862.

Fuqaha, A., et al., "Routing in All-Optical DWDM Networks with Sparse Wavelength Conversion Capabilities," IEEE Global Telecommunications Conference, New York, NY, IEEE, US, vol. 5, Dec. 1, 2003, pp. 2569-2574, XP010677816.

Li, Dan et al., "Evaluation of Possible Interior Gateway Protocol Extensions for Wavelength Switching Optical Networks," draft-li-ccamp-wson-igp-eval-00.txt, Nov. 1, 2007.

Sengupta, S., et al., "Analysis of Enhanced OSPF for Routing Lightpaths in Optical Mesh Networks," Proceedings of IEEE International Conference on Communications, vol. 5, Apr. 28, 2002, pp. 2869-2869.

Bradner, S., "Key Words for Use in RFCs to Indicate Requirement Levels", IETF Network Working Group, BCP 14, RFC 2119, Mar. 1997, 3 pgs.

ITU-T Recommendation G.694.1, "Spectral Grids for WDM Applications: DWDM Frequency Grid", Jun. 2002; 11 pgs.

Berger, L., "Generalized Multi-Protocol Label Switching (GMPLS) Signaling Functional Description", IETF Network Working Group, RFC 3471, Jan. 2003, 31 pgs.

ITU-T Recommendation G.694.2, "Spectral Grids for WDM Applications: CWDM Wavelength Grid", Dec. 2003, 10 pgs.

Kompella, K., et al., "Routing Extensions in Support of Generalized Multi-Protocol Label Switching (GMPLS)", IETF Network Working Group, RFC 4202, Oct. 2005, 25 pgs.

Kompella, K., et al., "OSPF Extensions in Support of Generalized Multi-Protocol Label Switching (GMPLS)", IETF Network Working Group, RFC 4203, Oct. 2005, 10 pgs.

Kompella, K., et al., "Intermediate System to Intermediate System (IS-IS) Extensions in Support of Generalized Multi-Protocol Label Switching (GMPLS)", IETF Network Working Group, RFC 4205, Oct. 2005, 10 pgs.

Otani, T., et al., "Generalized Labels of Lambda-Switching Capable Label Switching Routers (LSR)", work in progress: IETF Network Working Group, RFC 3471 (draft-otani-ccamp-gmpls-lambda-labels-00.txt), Jun. 2007, 10 pgs.

Bernstein, G., et al. "Framework for GMPLS and PCE Control of Wavelength Switched Optical Networks", work in progress: draft-bernstein-ccamp-wavelength-switched-01.txt, Sep. 13, 2007, 34 pgs.

McCloghrie, K., et. al.,"Structure of Management Information Version 2 (SMIv2)," RFC 2578, Apr. 1999.

McCloghrie, K., et. al.,"The Interfaces Group MIB," RFC 2863, Jun. 2000.

Papaddimitriou, D., et. al., "Generalized Multi-Protocol Label Switching (GMPLS) Signaling Extensions for G.709 Optical Transport networks Control," RFC 4328, Jan. 2006.

Otani, "Generalized Labels for G.694 Lambda-Switching Capable Label Switching Routers," draft-ietf-ccamp-gmpls-g-694-lambda-labels-02.txt, Jul. 14, 2008, 11 pages.

Bernstein, et al., "Routing and Wavelength Assignment Information for Wavelength Switched Optical Networks," draft-bernstein-ccamp-wson-info-00.txt, 34 pages, Oct. 30, 2007.

Bernstein, et al., "Routing and Wavelength Assignment Information for Wavelength Switched Optical Networks," draft-bernstein-ccamp-wson-info-03.txt, 30 pages, Jul. 7, 2008.

Vasseur, et al., "Path Computation Element (PCE) Communication Protocol (PCEP)," draft-ietf-pce-pcep-08.txt, 73 pages, Jul. 5, 2007.

Vasseur, et al., "Path Computation Element (PCE) Communication Protocol (PCEP)," draft-ietf-pce-pcep-12.txt, 77 pages, Mar. 24, 2008.

Kompella, et al., "Intermediate System to Intermediate System (IS-IS) Extensions in Support of Generalized Multi-Protocol Label Switching (GMPLS)," draft-ietf-isis-rfc4205bis-00.txt, 10 pages, Nov. 2006.

Bernstein, et al., "Routing and Wavelength Assignment Information Encoding for Wavelength Switched Optical Networks," draft-bernstein-ccamp-wson-encode-00.txt, 42 pages, Jul. 3, 2008.

Bernstein, et al., "Modeling WDM Wavelength Switching Systems for Use in GMPLS and Automated Path Computation," IEEE/OSA Journal of Optical Communication and Networking, vol. 1, Issue 1, Jun. 2009, 7 pages.

Foreign Communication From A Related Counterpart Application, European Application 08784150.8, European Office Action dated Apr. 12, 2012, 3 pages.

\* cited by examiner

ENCODING FOR INFORMATION NEEDED FOR ROUTING AND WAVELENGTH ASSIGNMENT IN WAVELENGTH SWITCHED OPTICAL NETWORKS

CROSS-REFERENCE TO RELATED APPLICATIONS

The present application claims priority to U.S. Provisional Patent Application Ser. No. 60/984,429 filed Nov. 1, 2007 by Bernstein et al. and entitled "Method For Compact Encodings For Information Needed For Routing And Wavelength Assignment In Wavelength Switched Optical Networks," which is incorporated herein by reference as if reproduced in its Entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the various signals that are being transported through the network at any given time. To complete the RWA process, sufficient information must be provided to this process to insure its successful completion. As such, the RWA continues to be one of the challenges in implementing WDM technology in optical networks.

SUMMARY

In one embodiment, the disclosure includes a network component comprising at least one control plane controller configured to implement a method comprising transmitting a message to at least one adjacent control plane controller, wherein the message comprises a Type-Length-Value (TLV) indicating RWA information.

In another embodiment, the disclosure includes a method comprising communicating a message comprising a TLV to a control plane controller, wherein the TLV indicates RWA information.

In yet another embodiment, the disclosure includes an apparatus comprising a control plane controller configured to communicate a TLV to at least one adjacent control plane controller, wherein the TLV indicates RWA information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method that may compactly encode the information needed for RWA in WDM networks, such as the WSON. Specifically, a control plane controller may send a message to at least one adjacent control plane controller, where the message comprises the RWA information in the form of at least one TLV. Examples of RWA information that may be included in the message are a connectivity matrix, a wavelength restriction, a wavelength range, a channel spacing, a transmitter range, a wavelength conversion capability, a wavelength bandwidth, a wavelength availability, and combinations thereof. The RWA information may be encoded using a link set TLV, a wavelength set TLV, or both. The link set TLV and/or the wavelength set TLV may reduce the size of the message used to carry to RWA information as compared to other message formats.

Figure 1:
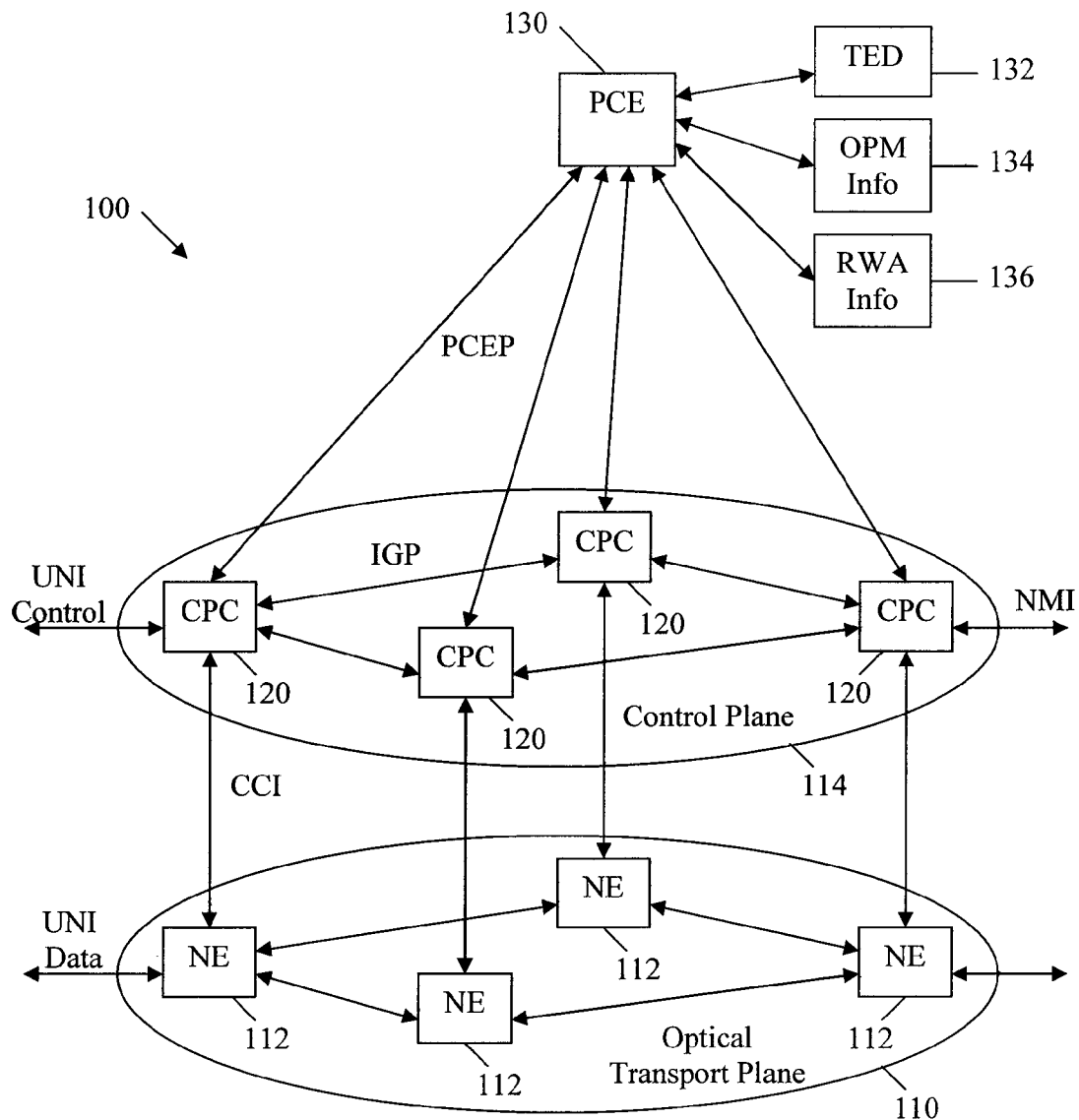
FIG. 1 is a schematic diagram of an embodiment of a WSON system.

FIG. 1 illustrates one embodiment of a WSON system 100. The system 100 may comprise an optical transport plane 110 comprising a plurality of NEs 112, a control plane 114 comprising a plurality of control plane controllers 120, and a PCE 130. The NEs 112, control plane controllers 120, and PCE 130 may communicate with each other via optical, electrical, or wireless means. In an embodiment, the NEs 112 may be coupled to one another using optical fibers. Similarly, the control plane controllers 120 may be coupled to one another using optical fibers, perhaps the same optical fibers used to connect the NEs 112. In some cases, these optical fibers may also be considered NEs 112. A plurality of optical signals may be transported through the optical transport plane 110 over lightpaths that may pass through some of the NEs 112. In addition, at least some of the NEs 112, for example those at the ends of the optical transport plane 110, may be configured to convert between electrical signals from external sources, e.g. user network interface (UNI) data, and the optical signals used in the optical transport plane 110. Similarly, at least some of the control plane controllers 120, for example those at the ends of the control plane 114, may be configured to convert between electrical signals from external sources, e.g. UNI control and/or network management interface (NMI) signals, and the optical signals used in the control plane 114. Although four NEs 112, four control plane controllers 120, and one PCE 130 are shown in the system 100, the system 100 may comprise any number of NEs 112, control plane controllers 120, or PCEs 130. Moreover, while a one-to-one relationship between the control plane controllers 120 and the NEs 112 is illustrated in FIG. 1, there may be many NEs 112 associated with a single control plane controller 120, or vice-versa. Similarly, while the control plane controllers 120 are associated with a single PCE 130 in FIG. 1, there may be many PCEs 130 in the system 100, and the control plane controllers 120 may be associated with one or more of the PCEs 130.

The optical transport plane 110 may be part of the system 100 that uses active or passive components to transport optical signals. The optical transport plane 110 may implement WDM to transport the optical signals through the optical transport plane 110, and may comprise various optical components as described in detail below. The optical transport plane 110 may be part of a long haul network, a metropolitan network, or a residential access network.

The NEs 112, also referred to as nodes, may be any devices or components that transport signals through the optical transport plane 110. In an embodiment, the NEs 112 consist essentially of optical processing components, such as line ports, add ports, drop ports, transmitters, receivers, amplifiers, optical taps, and so forth, and do not comprise any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combination thereof However, it may be advantageous for at least some of the NEs 112 to lack such converters as such may reduce the cost and complexity of the system 100. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combination thereof.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof These fiber types may be differentiated by their optical impairment characteristics, such as attenuation, chromatic dispersion, polarization mode dispersion, four wave mixing, or combinations thereof These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane 114 may be any part of the system 100 that handles operation, administration, and maintenance (OAM), control messages, and/or general administration of the system 100. The control plane 114 may use the optical transport plane 110 to exchange messages, or may have its own message distribution network. The control plane 114 may comprise various control plane controllers 120 as described in detail below.

The control plane controllers 120, also called optical connection controllers, may coordinate activities between the NEs 112. Specifically, the control plane controllers 120 may receive optical connection requests and provide lightpath signaling to the NEs 112 via a connection control interface (CCI), thereby coordinating the NEs 112 such that data signals are routed through the optical transport plane 110 with little or no contention. The control plane controllers 120 may communicate with each other using any suitable protocol, such as Generalized Multi-Protocol Switching (GMPLS) or an Interior Gateway Protocol (IGP). In addition, the control plane controllers 120 may communicate with the PCE 130 using PCE protocol (PCEP) to provide the PCE 130 with information that may be used for the RWA, receive the RWA from the PCE 130, and/or forward the RWA to the NEs 112. The control plane controllers 120 may be located in a component outside of the NEs 112, such as an external server, or may be part of the NEs 112. In an embodiment, the control plane controllers 120 can compute the RA, the WA, or both.

The PCE 130 may perform all or part of the RWA for the WSON system 100. Specifically, the PCE 130 may receive the wavelength or other information that may be used for the RWA from the control plane controllers 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise or interface with a global traffic-engineering database (TED) 132, a RWA information database 136, an optical performance monitor (OPM) 134, a physical layer constraint (PLC) information database (not shown), or combinations thereof. The PCC 130 may be located in a component outside of the system 100, such as an external server, or may be located in a component within the system 100, such as a control plane controller 120 or a NE 112.

In some embodiments, the RWA information may be sent to the PCE 130 by a Path Computation Client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
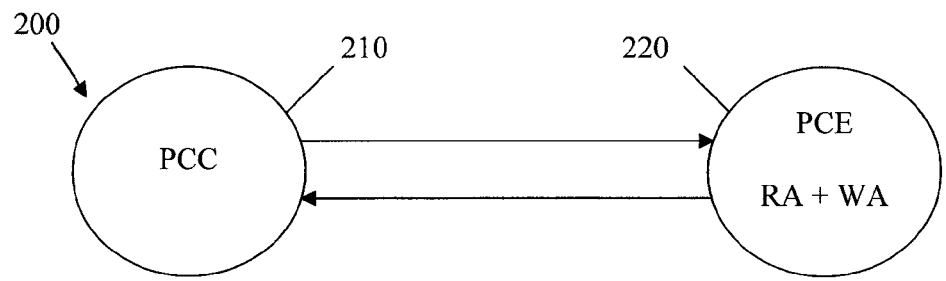
FIG. 2 is a schematic diagram of an embodiment of a path computation element (PCE) architecture.

The PCE 130 may be embodied in one of several architectures. FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information about the NEs and the network topology is provided. The combined RWA architecture 200 may be preferable for network optimization, smaller WSONs, or both.

Figure 3:
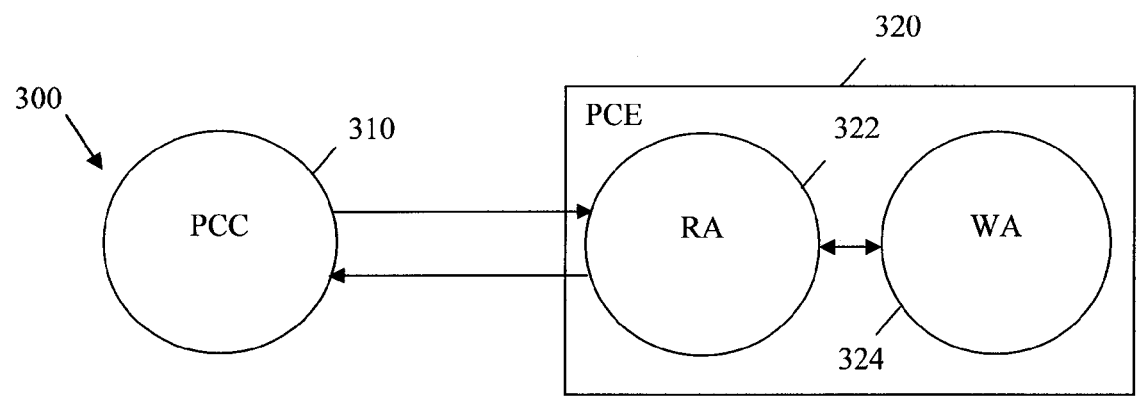
FIG. 3 is a schematic diagram of another embodiment of the PCE architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
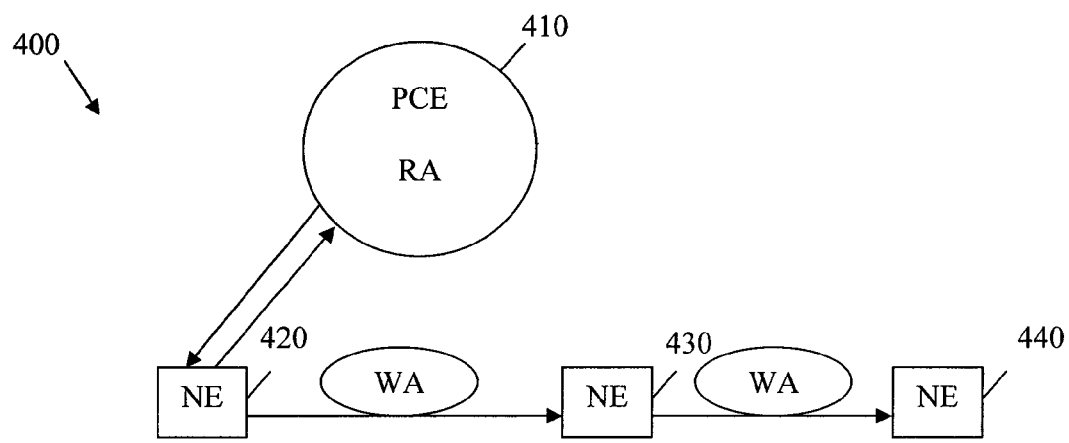
FIG. 4 is a schematic diagram of another embodiment of the PCE architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
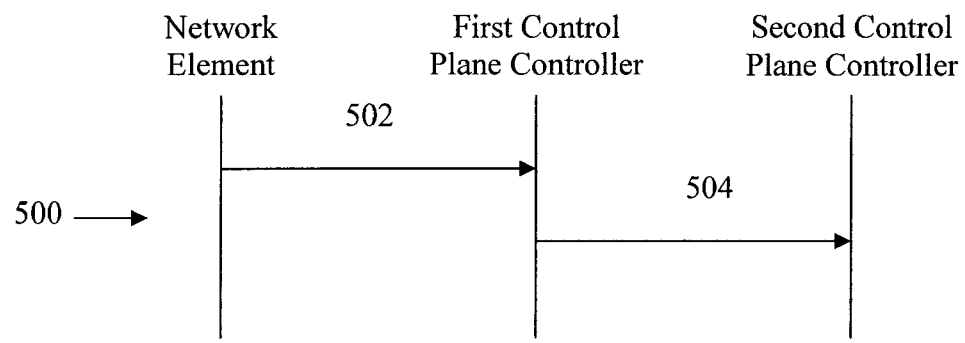
FIG. 5 is a protocol diagram of an embodiment of the communications between a NE, a first control plane controller, and a second control plane controller.

FIG. 5 illustrates an embodiment of a communication method 500 between a NE, a first control plane controller, and a second control plane controller, which may be an adjacent control plane controller. In some embodiments, the method 500 may occur between a NE, a first control plane controller, and the PCE, for example, when the first control plane controller sends the RWA information to the TED in the PCE. In the method 500, the first control plane controller obtains the RWA information 502 from at least one NE. The NE may send the RWA information 502 to the first control plane controller without prompting by the first control plane controller, or the NE may send the RWA information 502 to the first control plane controller in response to a request by the first control plane controller. The first control plane controller then sends a message 504 to the second control plane controller, where the message 504 comprises at least one of the RWA information described below. Specifically, the RWA information may be embodied in at least one TLV. As used herein, the term TLV may refer to any data structure that carries the RWA information. The message 504 and perhaps the TLV may also comprise a status indicator that indicates whether the RWA information is static or dynamic. In an embodiment, the status indicator may indicate how long the static or dynamic status lasts, so that the second control plane controller can know how long the RWA information is valid and/or when to expect an update. Additionally or alternatively, the message 504 and perhaps the TLV may comprise a type indicator that indicates whether the RWA information is associated with a node, a link, or both.

Figure 6:
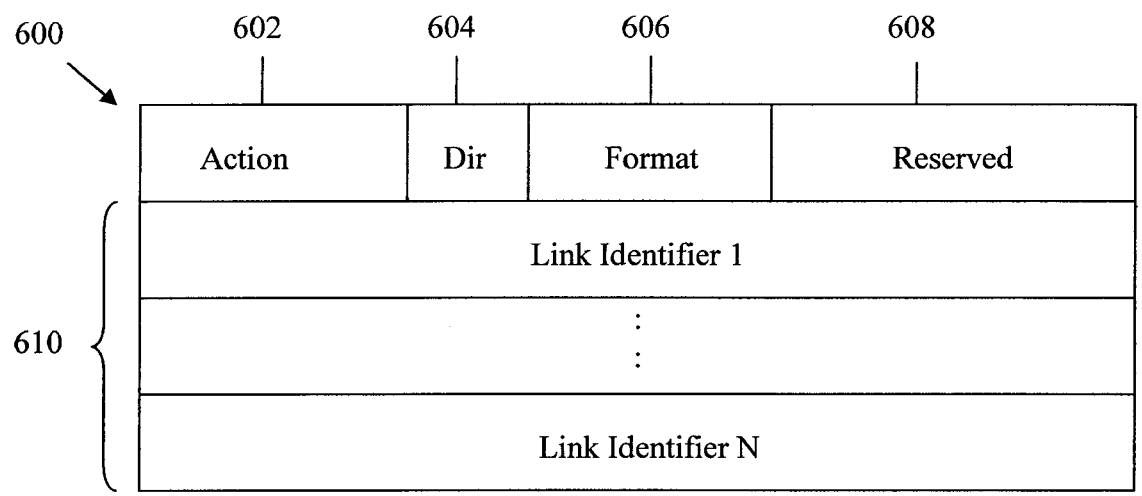
FIG. 6 is a schematic diagram of an embodiment of a link set TLV.

FIG. 6 illustrates one embodiment of a link set TLV 600. The link set TLV 600 may be used to encode at least one type of the RWA information discussed below when the RWA information is associated with at least one node and/or link. The link set TLV 600 may comprise an action field 602. The action field 602 may comprise the first about eight bits of the TLV 600, and may provide information regarding the link identifier(s) 610. For example, when the action field 602 is set to zero, the link identifier(s) 610 may represent an inclusive list in that the links identified in the link identifier(s) 610 are the only links in the link set. Similarly, when the action field 602 is set to one, the link identifier(s) 610 may represent an exclusive list in that the links identified in the link identifier(s) 610 are the only links that are excluded from the link set. In contrast, when the action field 602 is set to two, the link identifiers 610 may represent an inclusive range in that the link set comprises the links identified in the link identifiers 610 and any links there between. Moreover, when the action field 602 is set to three, the link identifiers 610 may represent an exclusive range in that the link set does not comprise the links identified in the link identifiers 610 and any links there between. In some cases, the order of the link identifiers 610 is unimportant such that the link identifiers 610 may be arranged in any order.

The link set TLV 600 may also comprise a directionality (Dir) field 604, a format field 606, a reserved field 608, and at least one link identifier 610. The Dir field 604 may comprise the subsequent about two bits of the TLV 600, and may indicate the directionality of the links in the link set. For example, the links may be bidirectional links when the Dir field 604 is set to zero. Alternatively, the links may be ingress links when the Dir field 604 is set to one, or the links may be egress links when the Dir field 604 is set to two. The format field 606 may comprise the subsequent about six bits of the TLV 600, and may indicate the format of the link identifier 610. For example, the format field 606 may indicate the link identifier 610 is formatted as a link local identifier when the format field 606 is set to zero. The reserved field 608 may comprise the subsequent about 16 bits of the TLV 600, and may be used for other purposes. At least one link identifier 610 may be included in the TLV 600, where each link identifier 610 is about 32 bits in length and indentifies a particular link for the purposes described herein, e.g. inclusive lists, exclusive lists, inclusive ranges, or exclusive ranges.

Figure 7:
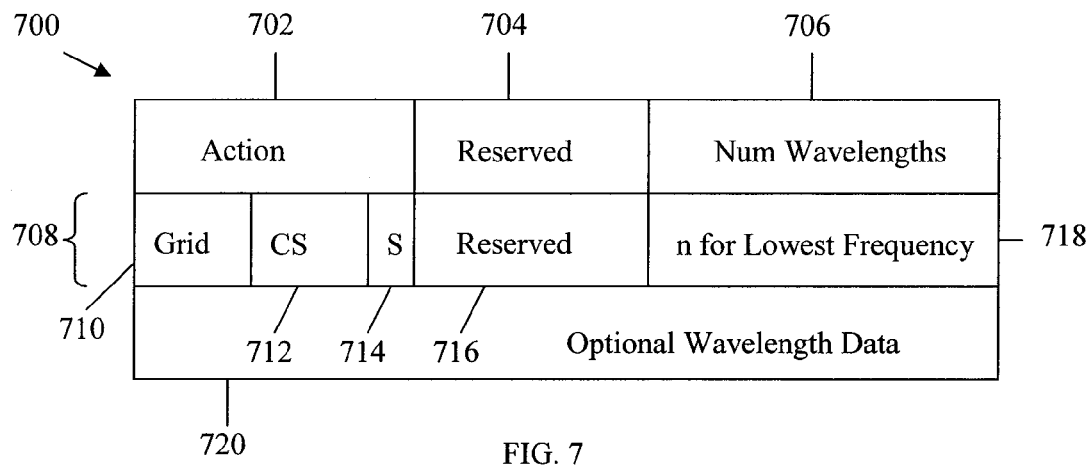
FIG. 7 is a schematic diagram of an embodiment of a wavelength set TLV.

FIG. 7 illustrates one embodiment of a wavelength set TLV 700. The wavelength set TLV 700 may be used to encode at least one type of the RWA information discussed below when the RWA information is associated with at least one node, link, and/or wavelength. The TLV 700 may comprise an action field 702. The action field 702 may comprise the first about eight bits of the TLV 700, and may provide information regarding the wavelength(s) identified in a lambda label 708 and an optional wavelength data 720, both of which are described below. For example, when the action field 702 is set to zero, the lambda label 708 and the wavelength data 720 may represent an inclusive list in that the wavelengths identified in the lambda label 708 and the wavelength data 720 are the only wavelengths in the wavelength set. Similarly, when the action field 702 is set to one, the lambda label 708 and the wavelength data 720 may represent an exclusive list in that the wavelengths identified in the lambda label 708 and the wavelength data 720 are the only wavelengths that are excluded from the wavelength set. In contrast, when the action field 702 is set to two, the lambda label 708 may represent an inclusive range in that the lambda label 708 identifies the first wavelength and the total number of wavelengths that are included in the wavelength set. Moreover, when the action field 702 is set to three, the lambda label 708 may represent an exclusive range in that the lambda label 708 identifies the first wavelength and the total number of wavelengths that are excluded from the wavelength set. Finally, when the action field 702 is set to four, the lambda label 708 and the wavelength data 720 may define the wavelength set using a bitmap, where the wavelength data 720 is a bitmap indicating which wavelengths are included in the wavelength set and the lambda label 708 identifies the first wavelength in the bitmap. In any event, the lambda label 708 may identify one wavelength in the wavelength set and provide the information needed to determine the remaining wavelengths in the wavelength set.

The TLV 700 may also comprise a reserved field 704 and a number of wavelengths (num wavelengths) field 706. The reserved field 704 may comprise the subsequent about eight bits of the TLV 700, and may be used for other purposes. The num wavelengths field 706 may comprise the subsequent about 16 bits of the TLV 700, and may indicate the quantity of wavelengths in the wavelength data 720, e.g. when the action field 702 is set to zero or one. In such cases, the quantity of wavelengths in the wavelength set may be one more than the quantity of wavelengths in the wavelength data 720 because the lambda label 708 comprises the first wavelength in the wavelength set. Alternatively, the num wavelengths field 706 may indicate the quantity of wavelengths in the wavelength set.

The TLV 700 may also comprise a lambda label 708 and an optional wavelength data 720. The lambda label 708 may be used to represent at least one wavelength in a standardized wavelength grid, such as DWDM or CWDM described above. The lambda label 708 may comprise a grid field 710, a channel spacing (CS) field 712, a sign (S) field 714, a reserved field 716, and a number (n) field 718. The grid field 710 may comprise the subsequent about four bits of the TLV 700, and may indicate the WDM grid specification is being used. For example, the grid field 710 may be set to one to indicate an ITU-T DWDM wavelength grid, or the grid field 710 may be set to two to indicate an ITU-T CWDM wavelength grid. The CS field 712 may comprise the subsequent about four bits of the TLV 700, and may indicate the spacing between the wavelength channels. For example, the CS field 712 may be set to one to indicate a channel spacing of about 12.5 gigahertz (GHz), the CS field 712 may be set to two to indicate a channel spacing of about 25 GHz, or the CS field 712 may be set to three to indicate a channel spacing of about 50 GHz. Alternatively, the CS field 712 may be set to four to indicate a channel spacing of about 100 GHz, or the CS field 712 may be set to five to indicate a channel spacing of about 200 GHz. The S field 714 may comprise the subsequent about one bit of the TLV 700, and may indicate the sign used to offset from the center frequency. For example, the S field 714 may be set to zero to indicate a positive (+) sign, or the S field 714 may be set to one to indicate a negative (−). The reserved field 716 may comprise the subsequent about eight bits of the TLV 700, and may be used for other purposes. The n field 718 may be about the subsequent 16 bits, and may be used to specify a specific frequency or wavelength. For example, n may be an integer used to specify a frequency using the formula:

$$\text{Frequency} = 193.1 \text{ terahertz (THz)} \pm n^*(\text{channel spacing})$$

where the ± is selected based on the sign in the S field 714 and the channel spacing is defined in the CS field 712. More information on the lambda label 708 can be found in Otani, et al., *Generalized Labels of Lambda-Switching Capable Label Switching Routers (LSR)*, IETF RFC 3471, draft-otani-ccamp-gmpls-lambda-labels-02.txt, December 2007, which is incorporated herein by reference as if reproduced in its entirety. The wavelength data 720 may be optional and may be included if needed to specify the wavelength set. Specifically, the wavelength data 720 may comprise at least one wavelength when the action field 702 is set to zero or one and the num wavelengths field 706 is greater than or about equal to two. Alternatively, the wavelength data 720 may comprise a bitmap when the action field 702 is set to four. When the num wavelengths field 706 ends with less than a full 32-bit word, the remaining bits, e.g. up to the $32^{nd}$ bit, may be filled with zeros (zero padded). In some cases, the wavelengths in the num wavelengths field 706 are unimportant such that the wavelengths may be arranged in any order.

Figure 8:
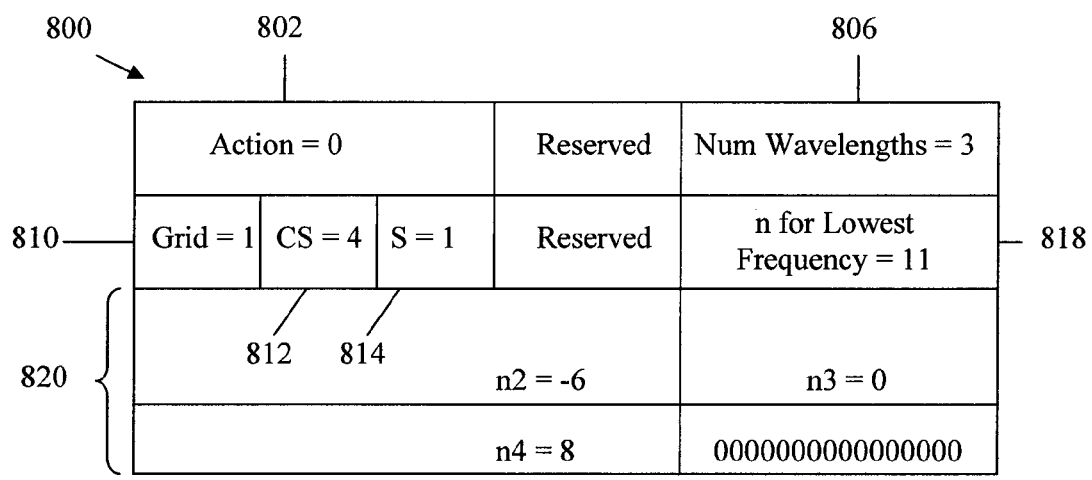
FIG. 8 is a schematic diagram of an embodiment of a wavelength list TLV.

FIG. 8 is an example of a wavelength set TLV 800 that illustrates the inclusive list embodiment. The action field 802 is set to zero, which may indicate that the TLV 800 contains an inclusive list of wavelengths that make up the wavelength set.

The num wavelengths field 806 is set to three, which may indicate that there are three wavelengths in the wavelength data 820. The grid field 810 is set to one, which may indicate that the ITU-T DWDM grid is being used. The CS field 812 is set to four, which may indicate a channel spacing of 100 GHz. The S field 814 is set to one, which may indicate a negative sign. The n field 818 may be set to eleven, which may indicate that 192.0 THz is the lowest frequency in the set (calculated by 193.1 THz−11*(100 GHz)). The wavelength data 820 comprises the numbers negative six, zero, and eight, which may correspond to frequencies 192.5 THz (calculated by 193.1 THz−6*(100 GHz)), 193.1 THz (calculated by 193.1 THz+0*(100 GHz)), and 193.9 THz (calculated by 193.1 THz+8*(100 GHz)). The remainder of the TLV 800 is zero padded. Thus, the TLV 800 may indicate that the wavelength set consists of 192.0 THz, 192.5 THz, 193.1 THz, and 193.9 THz.

Figure 9:
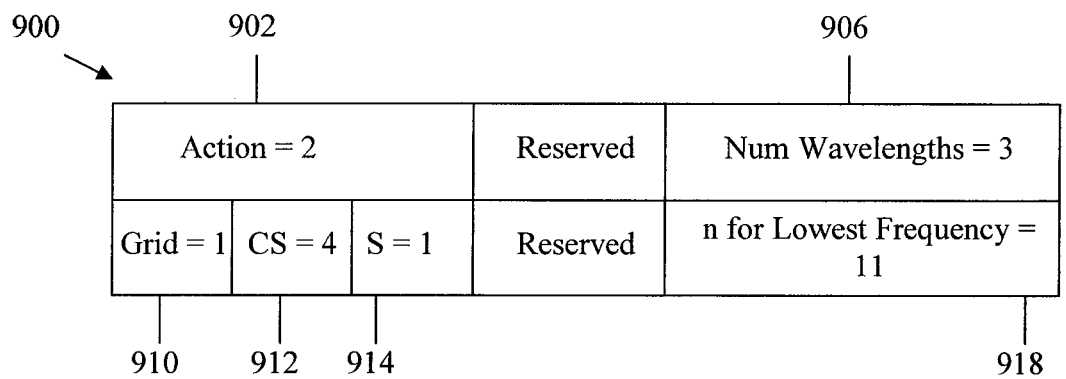
FIG. 9 is a schematic diagram of an embodiment of a wavelength range TLV.

FIG. 9 is an example of a wavelength set TLV 900 that illustrates the inclusive range embodiment. The action field 902 is set to two, which may indicate that the TLV 900 contains an inclusive range of wavelengths that make up the wavelength set. The num wavelengths field 906 is set to three, which may indicate that there are three wavelengths in the wavelength set. The grid field 910 is set to one, which may indicate that the ITU-T DWDM grid is being used. The CS field 912 is set to four, which may indicate a channel spacing of 100 GHz. The S field 914 is set to one, which may indicate a negative sign. The n field 918 may be set to eleven, which may indicate that 192.0 THz is the lowest frequency in the set (calculated by 193.1 THz−11*(100 GHz)). The remaining wavelengths in the set may be determined by incrementing the lowest wavelength by the channel spacing, and repeating the incrementing process the number of times specified in the num wavelengths field 906. Thus, the TLV 900 may indicate that the wavelength set consists of 192.0 THz, 192.1 THz, and 192.2 THz.

Figure 10:
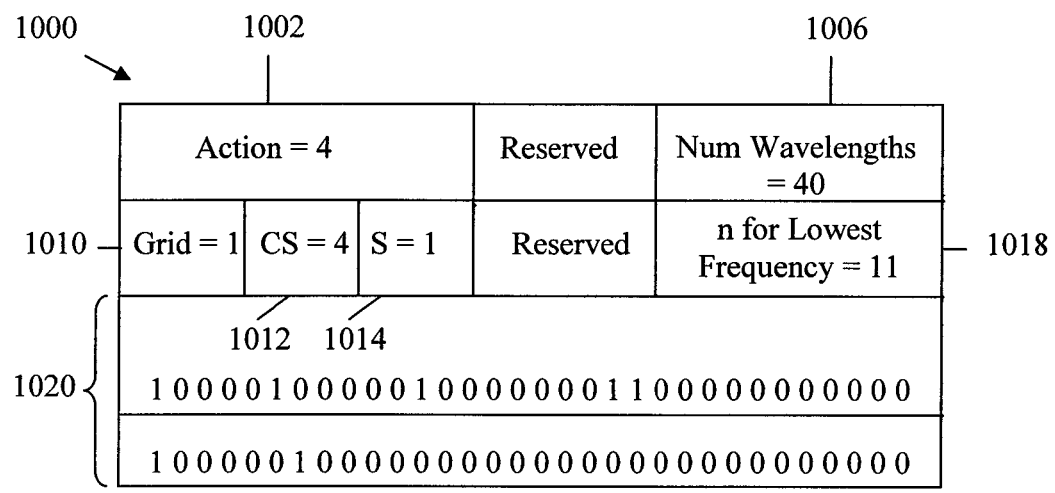
FIG. 10 is a schematic diagram of an embodiment of a wavelength bitmap TLV.

FIG. 10 is an example of a wavelength set TLV 1000 that illustrates a bitmap embodiment. The action field 1002 is set to four, which may indicate that the TLV 1000 contains a bitmap that indicates the wavelength set. The num wavelengths field 1006 is set to 40, which may indicate that there are 40 wavelengths represented in the bitmap. The grid field 1010 is set to one, which may indicate that the ITU-T DWDM grid is being used. The CS field 1012 is set to four, which may indicate a channel spacing of 100 GHz. The S field 1014 is set to one, which may indicate a negative sign. The n field 1018 may be set to eleven, which may indicate that 192.0 THz is the lowest frequency in the set (calculated by 193.1 THz−11*(100 GHz)). The bitmap 1020 contains ones at the following locations: 0, 5, 11, 19, 20, 32, and 38, and the remaining bitmap locations contain zeros. The bitmap 1020 values correspond to n values of −11, −6, 0, 8, 9, 21, and 27, respectively. Thus, the TLV 1000 may indicate that the wavelength set consists of 192.0 THz, 192.5 THz, 193.1 THz, 193.9 THz, 194.0 THz, 195.2 THz, and 195.8 THz. The remaining potion of the TLV 1000 has been filled with zeros.

The link set TLV and wavelength set TLV described above may be used to encode the RWA information in the message described above. The RWA information may be any information or data that may be used to calculate the RWA solution. In an embodiment, the RWA information may include a connectivity matrix. The connectivity matrix may indicate the internal port-to-port connectivity status of a node, such as the ROADM or OXC described above. The connectivity matrix can be represented by a matrix where the rows of the matrix represent the node's ingress ports, the columns of the matrix represent the node's egress ports (or vice-versa), and the individual elements within the matrix indicate the connectivity between the respective ingress port and egress port. For example, a one may be used to indicate connectivity between the ingress port and the egress port, and a zero may be used to indicate a lack of connectivity between the ingress port and the egress port (or vice-versa). The connectivity matrix may be static in that port-to-port connectivity of the node does not typically change once the node is installed in the network. Finally, the message described above may contain the connectivity matrix for each node within the network.

Figure 11:
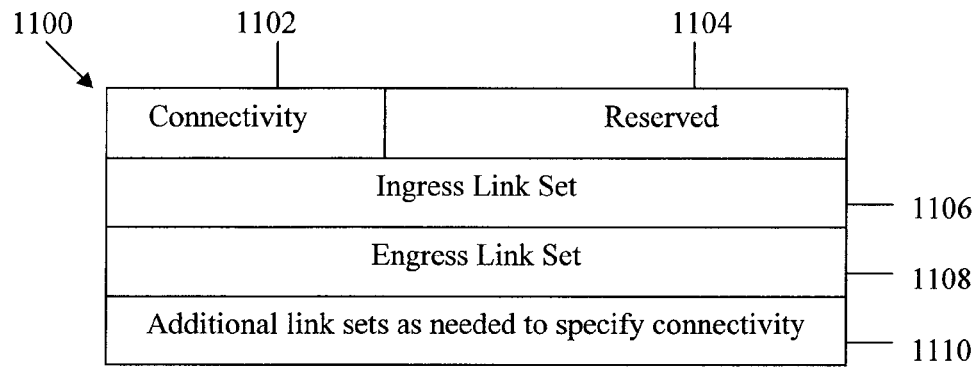
FIG. 11 is a schematic diagram of an embodiment of a connectivity matrix TLV.

FIG. 11 illustrates an embodiment of a connectivity matrix TLV 1100. The TLV 1100 may be used to indicate the connectivity matrix described above. The TLV 1100 comprises a connectivity field 1102, a reserved field 1104, at least one ingress link set 1106, at least one egress link set 1108, and optionally additional link sets 1110. The connectivity field 1102 may comprise the first about seven bits of the TLV 1100, and may indicate the reconfigurability of a network element. For example, the connectivity field 1102 may be set to zero when the network element is fixed and may be set to one when the network element is reconfigurable, as is the case with a ROADM or OXC. The reserved field 1104 may be the subsequent about 24 bits of the TLV 1100, and may be used for other purposes. Each ingress link set 1106 may be variable in length, and may be one of the link sets described above. Specifically, the ingress link set 1106 may specify the ingress links for the node. Each egress link set 1108 may be variable in length, and may be one of the link sets described above. Specifically, the ingress link set 1106 may specify the egress links for the node. The optional additional link sets 1110 may be variable in length, may be one of the link sets described above, and may specify any additional links. In some cases, the order of the ingress link set 1106, the egress link set 1108, and the optional additional link sets 1110 is unimportant such that the link sets may be arranged in any order.

The connectivity matrix TLV 1100 may be better understood by applying it to a two-degree, 40-channel ROADM as an example. The ROADM may have one line side ingress port, one line side egress port, 40 add ports, and 40 drop ports. The ports may be numbered and identified according to the link to which they are connected, such that the line side ingress port can be identified by link local identifier #1, the 40 add ports can be identified by link local identifiers #2-#41, the egress line side port can be identified by link local identifier #42, and the 40 drop ports can be identified by link local identifiers #43-#82. Within the ROADM, the line side ingress port may be connected to the line side egress port and to all of the drop ports. Similarly, the add ports may be connected to the line side egress port, but not any of the drop ports.

Figure 12:
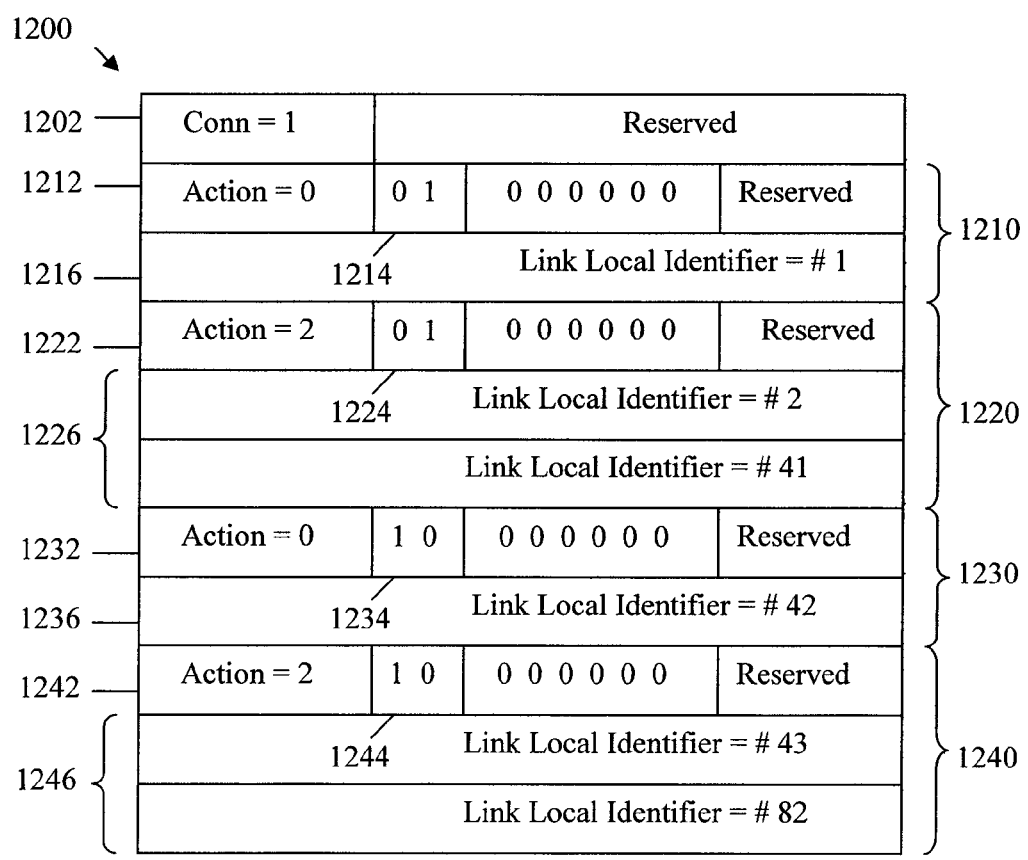
FIG. 12 is a schematic diagram of another embodiment of the connectivity matrix TLV.

FIG. 12 illustrates an example of the connectivity matrix TLV 1200 for the ROADM described above. The TLV 1200 is similar to the TLV 1100 described above and uses the link set TLVs 600 described above for the ingress link sets and the egress link sets. Specifically, the connectivity field 1202 is set to one, which may indicate that the network element, e.g. the ROADM, is reconfigurable. The TLV 1200 also comprises four link sets: a first ingress link set 1210, a second ingress link set 1220, a first egress link set 1230, and a second egress link set 1240. Turning to the first ingress link set 1210, the action field 1212 is set to zero, which may indicate that the first ingress link set 1210 represents an inclusive list. In addition, the Dir field 1214 in the first ingress link set 1210 is set to one, which may indicate that the first ingress link set 1210 represents ingress ports. Finally, the link identifier 1216 within the first ingress link set 1210 identifies link number 1. Thus, the first ingress link set 1210 may identify the first link set in the reconfigurable device as being a single ingress port, namely port #1. Turning to the second ingress link set 1220, the action field 1222 is set to two, which may indicate that the second ingress link set 1220 represents an inclusive range. In addition, the Dir field 1224 in the second ingress link set 1220 is set to one, which may indicate that the second ingress link set 1220 represents ingress ports. Finally, the link identifiers 1226 within the second ingress link set 1220 identify link numbers 2 and 41. Thus, the second ingress link set 1220 may identify the second link set in the reconfigurable device as being forty ingress ports, namely ports #2-#41.

Turning to the first egress link set 1230, the action field 1232 is set to zero, which may indicate that the first egress link set 1230 represents an inclusive list. In addition, the Dir field 1234 in the first egress link set 1230 is set to two, which may indicate that the first egress link set 1230 represents egress ports. Finally, the link identifier 1236 within the first egress link set 1230 identifies link number 42. Thus, the first egress link set 1230 may identify the third link set in the reconfigurable device as being a single egress port, namely port #42. Turning to the second egress link set 1240, the action field 1242 is set to two, which may indicate that the second egress link set 1240 represents an inclusive range. In addition, the Dir field 1244 in the second egress link set 1240 is set to two, which may indicate that the second egress link set 1240 represents egress ports. Finally, the link identifiers 1246 within the second egress link set 1240 identify link numbers 43 and 82. Thus, the second egress link set 1240 may identify the fourth link set in the reconfigurable device as being forty egress ports, namely ports #43-#82.

In an embodiment, the RWA information may include a wavelength range. The wavelength range, which may also be referred to as the WDM link or fiber wavelength range, may indicate how many different wavelengths a link or port can simultaneously accept, the range of wavelengths that the link or port can accept, or both. For example, the wavelength range may be multiple wavelengths selected from a full range of wavelengths, which may indicate that the node or link can accept a plurality of wavelengths simultaneously and is colorless in that it has no limitations on which wavelengths it can accept. Alternatively, the wavelength range may be a single wavelength selected from a full range of wavelengths, which may indicate that the node or link can accept only one wavelength at a time, but is colorless in that it has no limitations on which wavelength it can accept. Further in the alternative, the wavelength range may be a single, fixed wavelength, which may indicate that the node or link can accept only one wavelength at a time and is colored or colorful in that it is limited to a single wavelength. Moreover, the wavelength range may be multiple wavelengths selected from a reduced range of wavelengths, which may indicate that the node or link can accept a plurality of wavelengths simultaneously and is limited in the wavelengths it can accept, similar to wave band switching. Specifically, the node or link may be limited to a plurality of individual, discrete wavelengths or may be limited to a reduced range of wavelengths. The wavelength range may be static in that wavelength range that a node or link can accept does not typically change once the node or link is installed in the network. It will be appreciated that the wavelength range for a node may be the same for the entire node or may vary from port to port. In addition, the wavelength ranges for the node or for a node's port may be independent of and perhaps different from the wavelength ranges for the link that is coupled an individual port on the node. Finally, the message may contain the wavelength range for each node, each node's ports, each fiber, or combinations thereof within the network.

Figure 13:
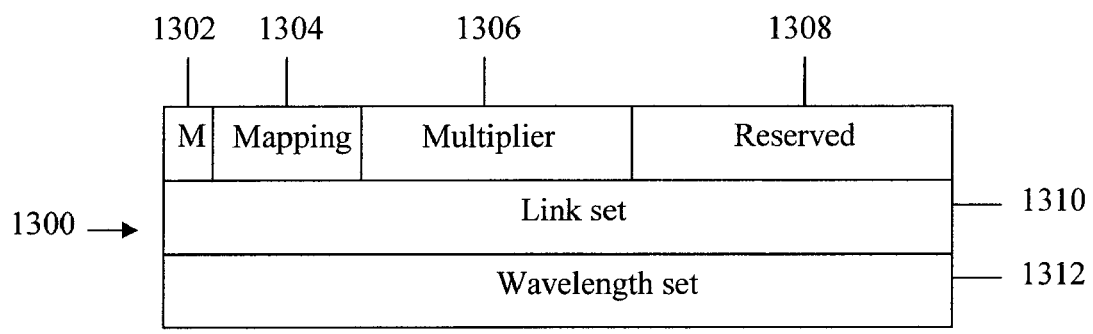
FIG. 13 is a schematic diagram of an example of a port wavelength restriction TLV.

FIG. 13 illustrates one embodiment of a port wavelength restriction TLV 1300. The TLV 1300 may be used to indicate the wavelength range described above. The TLV 1300 may comprise a multiple wavelength (M) field 1302. The M field 1302 may comprise the first about one bit of the TLV 1300, and may indicate whether the set of ports are single wavelength or multi-wavelength. For example, the TLV 1300 may indicate the ports can only accept a single wavelength (e.g. are colored or colorful) when the M field 1302 is set to zero, and the TLV 1300 may indicate the ports can accept multiple wavelengths (e.g. are colorless) when the M field 1302 is set to one.

The TLV 1300 may also comprise a mapping field 1304. The mapping field 1304 may be the subsequent about six bits of the TLV 1300, and may indicate how the wavelength in the wavelength set 1312 get assigned to the links in the link set 1310. For example, the TLV 1300 may indicate a one-to-many relationship in that each link in the link set may take any of the values in the wavelength set when the mapping field 1304 is set to zero. Such may be the case for single or multi-channel ports, e.g. when the M field 1302 is set to zero or one. Alternatively, the TLV 1300 may indicate a one-to-one relationship in that the links are assigned a single wavelength with respect to the order of links and wavelengths in their respective sets when the mapping field 1304 is set to one. Such may only be the case for single channel ports, e.g. when the M field 1302 is set to zero. The TLV 1300 may indicate a one-to-one via ranges and increments relationship in that a range of wavelengths may be provided for a single channel port when the mapping field 1304 is set to two. Specifically, the frequency may be determined using the formula:

$$\text{Frequency} = \text{Low Frequency} + k*(\text{Multiplier}+1)*(\text{CS})$$

where the Low Frequency is the lowest frequency in the wavelength range described in the wavelength set 1312, k is the ordinal of the link in the link set 1310 starting from zero, Multiplier is the number in the multiplier field 1306 described below, and CS is the channel spacing described in the wavelength set 1312. Such a representation creates a compact representation of ROADMs with colored drop ports having a regular frequency plan. Such may also only be the case for single channel ports, e.g. when the M field 1302 is set to zero.

The TLV 1300 may also comprise a multiplier field 1306, a reserved field 1308, a link set 1310, and a wavelength set 1312. The multiplier field 1306 may be the subsequent about eight bits of the TLV 1300, and may be a number used to specify the frequency in the above formula. The reserved field 1308 may be the subsequent about 16 bits of the TLV 1300, and may be used for other purposes. The link set 1310 may be variable in length, and may be one of the link sets described above. Finally, the wavelength set 1312 may be variable in length, and may be one of the wavelength sets described above.

In an embodiment, the RWA information may comprise a wavelength restriction, which may be embodied in a TLV similar to the port wavelength restriction TLV described above. The wavelength restriction, also referred to as the per port wavelength restriction, may indicate the modulation formats that the node or link can accept. For example, the node or link may be able to accept return-to-zero (RZ), non-return-to-zero (NRZ), non-return-to-zero, inverted (NRZI), or other modulation formats. The wavelength restriction may be static in that wavelength restriction that a node or link can accept does not typically change once the node or link is installed in the network. It will be appreciated that the wavelength restrictions for a node may be the same for the entire node or may vary from port to port. In addition, the wavelength restrictions for the node or for a node's port may be independent of and perhaps different from the wavelength restrictions for the link that is coupled an individual port on the node. Finally, the message may contain the wavelength restriction for each node, each node's ports, each fiber, or combinations thereof within the network.

In an embodiment, the RWA information may include a channel spacing, which may be embodied in a TLV similar to the port wavelength restriction TLV described above. The channel spacing, which may also be referred to as the WDM link channel spacing, may indicate the distance between wavelength channels in nanometers (or frequency spacing in inverse seconds). Alternatively, the channel spacing may identify a specific standard or other publication that defines the channel spacing. For example, the channel spacing could indicate that the node or links can accept CWDM channel spacing, DWDM channel spacing, or combinations thereof. It will be appreciated that the channel spacing for a node may be the same for the entire node or may vary from port to port. In addition, the channel spacing for the node or for a node's port may be independent of and perhaps different from the channel spacing for the link that is coupled an individual port on the node. Finally, the message may contain the channel spacing for each node, each node's ports, each fiber, or combinations thereof within the network.

In one embodiment, the RWA information may include a transmitter range, which may be embodied in a TLV similar to the wavelength set TLV described above. The transmitter range, which may be referred to as the laser transmitter range, may indicate the tunable range of wavelengths that a transmitter can transmit or that a node or link can accept. For example, the laser, node, or link may be colorless in that it has no limitations on which wavelengths it can transmit or accept. Alternatively, the laser, node, or link may be colorful in that it is limited to a single wavelength. Further in the alternative, the laser, node, or link may have a reduced range of wavelengths in that it is limited in the wavelengths it can transmit or accept. Specifically, the laser, node, or link may be limited to a plurality of individual, discrete wavelengths or may be limited to a reduced range of wavelengths. It will be appreciated that the transmitter range for a node may be the same for the entire node or may vary from port to port. In addition, the transmitter range for the node or for a node's port may be independent of and perhaps different from the transmitter range for the link that is coupled an individual port on the node. Finally, the message may contain the transmitter range for each node, each node's ports, each fiber, or combinations thereof within the network.

In one embodiment, the RWA information may include a wavelength conversion capability, which may be embodied in a TLV comprising an ingress wavelength set, an egress wavelength set, the supported signal types, and the supported bit rate range. The wavelength conversion capability may indicate whether a node has the ability to convert the wavelength to a different wavelength, e.g. via an OEO conversion. Additionally or alternatively, the wavelength conversion capability may indicate regeneration capability if the converters are also regenerators. The wavelength conversion capability may be static in that wavelength conversion capability of the node does not typically change once the node is installed in the network. However, the wavelength conversion capability may be dynamic in the case where there are a limited number of converters and the number of available converters can change with changing connection establishment within the network. Finally, the message may contain the wavelength conversion capability for each node within the network.

In an embodiment, the RWA information may include a wavelength availability, which may be embodied in a TLV similar to the wavelength set TLV described above, particularly the bitmap embodiment. The wavelength availability may indicate the availability of a wavelength at a node or link. For example, the wavelength availability may indicate the availability of a single wavelength on a specific link within the network. The wavelength availability may be dynamic in that wavelength availability of a node or link may vary any time there is a change in routing or wavelength assignment or use within the network. For a 120 channel system, using the bitmap wavelength set may only require four bitmap words in addition to the two general words in the encoding to fully characterize wavelength availability. It will be appreciated that a subset of the total system range could be sent representing only those wavelengths whose availabilities have changed, which would result in efficient use of the control plane bandwidth. It will be appreciated that the laser wavelength availability for a node may be the same for the entire node or may vary from port to port. In addition, the wavelength availability for the node or for a node's port may be independent of and perhaps different from the wavelength availability for the link that is coupled an individual port on the node. Finally, the message may contain the wavelength availability for each node, each node's ports, each fiber, or combinations thereof within the network.

In an embodiment, the RWA information may include a wavelength bandwidth, which may be embodied in any of the TLVs described herein. The wavelength bandwidth, which may also be referred to as the maximum bandwidth per wavelength, may indicate the bandwidth capacity or transmission rate associated with a wavelength in a node or link. For example, a wavelength could accept any transmission rate up to the specified rate, e.g. 10 gigabits per second (Gbps). Alternatively, the wavelength could be limited in operation to the specified rate, e.g. 40 Gbps. The wavelength bandwidth may be static in that wavelength bandwidth of a node or link does not typically change once the node or link is installed in the network. It will be appreciated that the laser wavelength bandwidth for a node may be the same for the entire node or may vary from port to port. In addition, the wavelength bandwidth for the node or for a node's port may be independent of and perhaps different from the wavelength bandwidth for the link that is coupled an individual port on the node. Finally, the message may contain the wavelength bandwidth for each node, each node's ports, each fiber, or combinations thereof within the network.

In some embodiments, all of the RWA information described herein may be needed to compute the RWA solution. For example, the connectivity matrix, the wavelength restriction, the wavelength range, the channel spacing, the transmitter range, the wavelength conversion capability, the wavelength bandwidth, and the wavelength availability may be required for the PCE or control plane controller to calculate the RWA in the combined RWA architecture described above. However, only some of the RWA information described herein may be required to calculate the RWA in other embodiments. For example, the wavelength availability may not be needed by the PCE or control plane controller in the case of the distributed WA architecture described above. Thus, the RWA information that the PCE and/or the control plane controller may need may vary from case to case.

Figure 14:
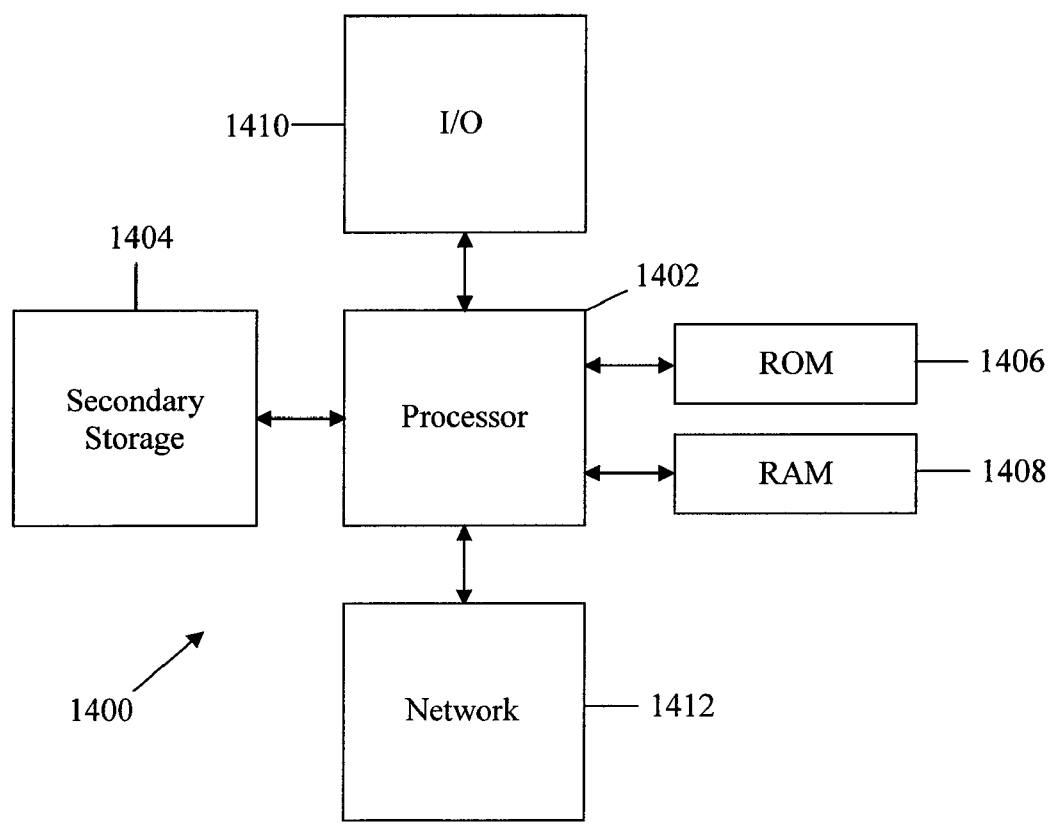
FIG. 14 is a schematic diagram of an embodiment of a general-purpose of computer system.

The network components described above may be implemented on any general-purpose network component, such as a computer or network component with sufficient processing power, memory resources, and network throughput capability to handle the necessary workload placed upon it. FIG. 14 illustrates a typical, general-purpose network component suitable for implementing one or more embodiments of the components disclosed herein. The network component 1400 comprises a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more application specific integrated circuits (ASICs).

The secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
at least one control plane controller configured to:
transmit a message to at least one adjacent control plane controller,
wherein the message comprises a Type-Length-Value (TLV) indicating Routing and Wavelength Assignment (RWA) information, and
wherein the RWA information indicates whether a network element is fixed or reconfigurable.

2. The network component of claim 1, wherein the RWA information comprises a connectivity matrix associated with a network element, and wherein the TLV comprises a connectivity field, an ingress link set, and an egress link set.

3. The network component of claim 2, wherein the connectivity field indicates the network element is fixed or reconfigurable, and wherein the network component is part of a wavelength switched optical network (WSON).

4. The network component of claim 2, wherein the ingress link set comprises an add side ingress port TLV and a line side ingress port TLV, and wherein the egress link set comprises a drop side egress port TLV and a line side egress port TLV.

5. The network component of claim 1, wherein the RWA information comprises a wavelength restriction, a wavelength range, a channel spacing, or combinations thereof, and wherein the TLV comprises a multiple wavelength (M) field, a mapping field, a link set comprising a plurality of links, and a wavelength set comprising a plurality of wavelengths.

6. The network component of claim 5, wherein the M bit indicates whether a port accepts a single wavelength or a plurality of wavelengths.

7. The network component of claim 5, wherein the mapping field indicates whether each link can accept any wavelength, the links are assigned to wavelengths according to the order of the link set and the wavelength set, or each link in the link set can accept a range of wavelengths.

8. The network component of claim 1, wherein the RWA information comprises a transmitter range, a wavelength availability, or both, and wherein the TLV comprises an action field, a number of wavelengths field, and a lambda label.

9. The network component of claim 8, wherein the action field indicates whether a plurality of wavelengths are represented by an inclusive list, an exclusive list, an inclusive range, an exclusive range, or a bitmap.

10. The network component of claim 9, wherein the number of wavelengths field indicates one less than the number of wavelengths in the inclusive list when the action field indicates an inclusive list, wherein the number of wavelengths field indicates one less than the number of wavelengths in the exclusive list when the action field indicates an exclusive list, wherein the number of wavelengths field indicates the number of wavelengths in the inclusive range when the action field indicates an inclusive range, wherein the number of wavelengths field indicates the number of wavelengths in the exclusive range when the action field indicates an exclusive range, and wherein the number of wavelengths field indicates the number of wavelengths represented by the bitmap when the action field indicates a bitmap.

11. The network component of claim 1, wherein the RWA information comprises a wavelength conversion capability, and wherein the TLV comprises an input wavelength set, an output wavelength set, a signal type, and a bit rate range.

12. A method comprising:
communicating, by a processor, a message comprising a Type-Length-Value (TLV) to a control plane controller,
wherein the TLV indicates Routing and Wavelength Assignment (RWA) information, and
wherein the RWA information indicates whether a network element is fixed or reconfigurable.

13. The method of claim 12, wherein the TLV comprises an action field, a directionality field, and a plurality of link sets comprising a plurality of links in a wavelength switched optical network (WSON).

14. The method of claim 13, wherein the action field indicates whether the links are an inclusive list, an exclusive list, an inclusive range, or an exclusive range.

15. The method of claim 13, wherein the directionality field indicates whether the links are bidirectional links, ingress links, or egress links.

16. An apparatus comprising:
a control plane controller configured to communicate a Type-Length-Value (TLV) to at least one adjacent control plane controller,
wherein the TLV indicates Routing and Wavelength Assignment (RWA) information, and
wherein the TLV comprises an action field, a number of wavelengths field, and a lambda label.

17. The apparatus of claim 16, wherein the TLV further comprises a plurality of wavelengths, wherein the action field indicates whether the wavelengths are an inclusive list and the number of wavelengths field indicates one less than the number of wavelengths in the inclusive list, or the wavelengths are an exclusive list and the number of wavelengths field indicates one less than the number of wavelengths in the exclusive list.

18. The apparatus of claim 16, wherein the TLV further comprises one wavelength, wherein the action field indicates whether the wavelength is the first wavelength in an inclusive range and the number of wavelengths field indicates the number of wavelengths in the inclusive range, or the wavelength is the first wavelength in an exclusive range and the number of wavelengths field indicates the number of wavelengths in the exclusive range.

19. The apparatus of claim 16, wherein the TLV further comprises a bitmap, and wherein the number of wavelengths field indicates the number of wavelengths in the bitmap.

20. The apparatus of claim 16, wherein the RWA information indicates whether a network element in a wavelength switched optical network (WSON) is fixed or reconfigurable.

21. A method comprising:
transmitting a type-length-value (TLV) that describes a plurality of links in a link set, wherein the TLV comprises:
an action field that indicates either that one or more link identifiers are included in the link set, or that indicates that the link set defines a range of links;
a directionality field that indicates whether the link set is bidirectional, ingress, or egress;
a format field that indicates whether the links in the link set are identified by link local identifiers; and
at least one link identifier.

22. The method of claim 21, wherein the TLV further comprises:
a connectivity field that indicates whether a device is fixed or switched;
an ingress link set field comprising the action field, the directionality field, the format field, and the link identifier; and
an egress link set field.

23. The method of claim 22, wherein the connectivity field indicates that the device is switched, and wherein the switched device is a reconfigurable optical add/drop multiplexer (ROADM) or an optical cross-connect (OXC).

24. A method comprising:
transmitting a type-length-value (TLV) that describes a plurality of wavelengths in a label set, wherein the TLV comprises:
an action field that indicates that the label set is an inclusive list, and exclusive list, and inclusive range, and exclusive range, or a bitmap;
a field that indicates the number of labels represented by the bitmap when the action field indicates that the label set is the bitmap; and
a label that indicates a wavelength.

25. The method of claim 24, wherein the action field indicates that the label set is the bitmap, wherein the bitmap comprises a plurality of bits that represent a particular label with a value or either zero or one indicating whether the label is in the label set or not, wherein bit position zero represents the lowest label and corresponds to the base label, and wherein each succeeding bit position represents the next label logically above the previous label.

* * * * *